Aug. 27, 1957 E. DONG 2,804,012
OUTDOOR BARBECUES
Filed March 22, 1956
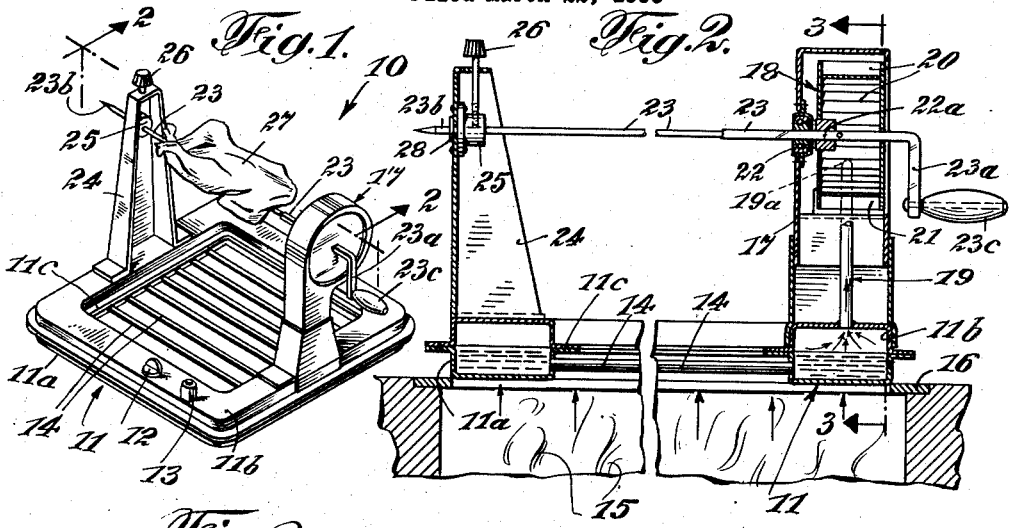
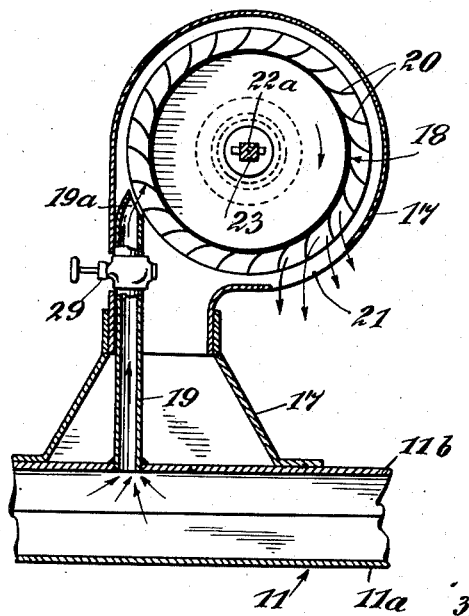
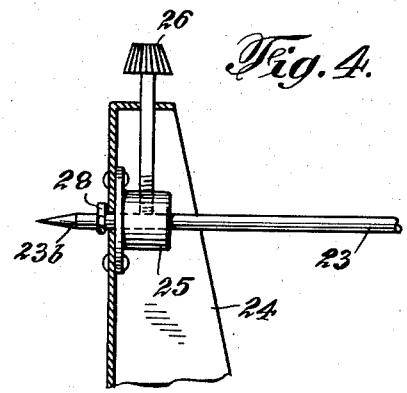
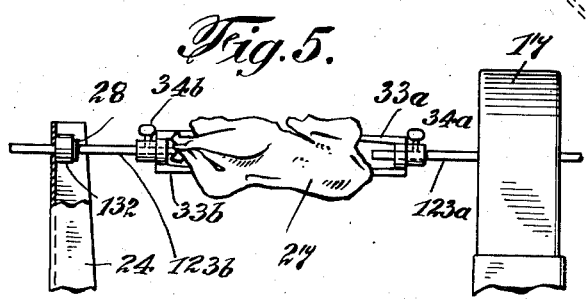
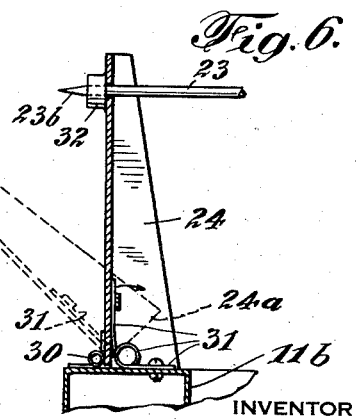
INVENTOR
Edward Dong
BY C. P. Goepel
his ATTORNEY

United States Patent Office 2,804,012
Patented Aug. 27, 1957

2,804,012

OUTDOOR BARBECUES

Edward Dong, Brooklyn, N. Y.

Application March 22, 1956, Serial No. 573,210

5 Claims. (Cl. 99—421)

This invention relates to barbecues in general, and more particularly to an outdoor barbecue that automatically rotates the roast.

Automatic electric barbecues are becoming increasingly popular because of savings in time and effort. Such automatic devices require practically no supervision as the roast is attached to a rotatable shaft and various timing devices and signals control and indicate the roasting time, the intensity of heat, rotational speed of the shaft, etc. However, the known barbecues for outdoor parties require constant attention, especially for rotation of the roast supporting shaft in order to prevent burning of the same since no electric power is generally available in the picnicking areas.

The present invention represents an improvement in such outdoor barbecues by the provision of an apparatus that generates steam for automatic rotation of the roast supporting shaft. To this end, I provide a water tank, preferably forming the base of the barbecue, which may be placed over the fire for generation and storage of steam, and the shaft is entrained by a turbine wheel which is rotated at a controlled velocity by the produced steam. To increase the steam production, additional piping exposed to the flames may be provided, and various other devices, such as a conventional crank handle, a safety valve, brake means for the rotating shaft, etc., are preferably provided to add to the safety and utility of my novel device.

A preferred embodiment of the automatic outdoor barbecue is illustrated in the figures of the accompanying drawing, wherein similar characters of reference indicate similar elements, and the invention is pointed out in the appended claims.

In the drawing,

Fig. 1 is a perspective view of the novel barbecue;

Fig. 2 is a vertical section of the barbecue placed on an outdoor hearth, taken on line 2—2 in Fig. 1;

Fig. 3 is a section taken on line 3—3 in Fig. 2;

Fig. 4 is an enlarged detail view of the shaft brake;

Fig. 5 shows a modified two-piece shaft; and

Fig. 6 is a view of a modified shaft supporting bracket.

Referring now in more detail to the illustrated embodiment, barbecue 10 includes a base 11 which serves as a water tank. The water is refilled through an opening normally closed by a plug 12. A safety valve 13 is provided for release of excess steam. As better seen in Fig. 2, base 11 consists of a pair of superposed sections 11a, 11b which are integrated by spot welding. A number of pipes 14 connect two opposing halves of the base 11 and are directly exposed to the flames 15 when the barbecue 10 is placed over a camp fire, and more particularly onto a grill 16, as shown in Fig. 2.

A housing 17 for the steam turbine wheel 18 is supported by the upper half 11b of the base tank 11, and a vertical pipe 19, having a nozzle 19a, extends from the tank into the proximity of turbine blades 20. The spent steam is free to escape through the opening 21 (see Fig. 3).

Turbine wheel rotates in suitable bearings 22 carried by the housing 17 and has a central, preferably square bore 22a for reception of a shaft 23 whose one end 23a is bent at an angle of approximately 90° and carries a handle 23c permitting manual rotation of the shaft 23 while the steam is being generated. The other end 23b of shaft 23 is received and may project through an aligned bracket 24 having a bearing 25 and preferably a thumb screw 26 to control the velocity of the rotating shaft 23. A snap ring 28 locks the shaft 23 in position.

The operation of the barbecue will be easily understood and because of its simplicity safely handled by housewives and other unskilled persons who find pleasure in outdoor picnicking. The device is placed over the fire with a roast 27 on the shaft 23. The steam is generated in tank 11 and when its pressure is sufficient, starts to rotate the wheel 18 which may be temporarily rotated by the handle 23c. The velocity of rotation is controlled by thumb screw 26.

The nozzle 19a at the upper end of conduit 19 may be a commercial article with an outwardly extending control valve 29 (see Fig. 3) to reduce or close the supply of steam, in which case the thumb screw 26 may be omitted.

A modification of shaft 23 is shown in Fig. 5. The shaft consists of two portions, to wit: a square portion 123a passing through housing 17 and rotated by turbine wheel 18 (not shown), and a portion 123b that is inserted through bearing 132 supported by the bracket 24 and is maintained against axially sliding movement by the snap ring 28 or the like. Shafts 123a, 123b carry, respectively, two-pronged meat supporting forks 33a, 33b fastened thereto by thumb screws 34a, 34b or the like. This system is preferred because the shaft need not be driven through the roast 27. However, members 33a, 33b may also be provided on shaft 23 and used in the manner well known in electric broilers.

Finally, as shown in Fig. 6, the bracket 24 may be pivotally attached to the tank 11, as at 30, and a coil spring 31 provided to normally urge the bracket 24 with an outer bearing 32 into its position shown in full lines, the heel 24a acting as a stop. To attach or remove the roast, bracket 24 is simply swung into the position indicated in dotted lines.

A grill (not shown) may be placed onto the inner flange 11c of the base member 11 for preparation of certain foods, such as hamburgers and the like.

Various changes and modifications in design and by substitution of similar or equivalent elements may occur to persons skilled in the art within the spirit of my invention, and I therefore do not desire to be limited to the exact details of the embodiments shown and described, but only by the scope of the appended claims.

I claim:

1. In an outdoor barbecue, a base member adapted to be exposed to heating action of flames including a liquid tank and having a central opening for passage of flames therethrough, a pair of upright supporting members extending upwardly from said base member, a shaft rotatably held by said supporting members above and across said opening in said base member, a steam turbine wheel in one of said supporting members and attached to said shaft, and a conduit between said tank and said turbine wheel for passage of steam and rotation of said turbine wheel and said shaft when said base member is exposed to heating action of flames and steam is generated therein.

2. The apparatus of claim 1, wherein a valve is provided in said conduit for controlling the supply of steam from said tank to said turbine wheel and the angular velocity of said shaft.

3. The apparatus of claim 1, wherein the other of said supporting members is pivotally attached to said base member in such manner that it moves away from and releases said shaft when pivoted from its upright position, whereby the article of food may be removed from said shaft.

4. The apparatus of claim 1, further including a plurality of connecting pipes for liquid storage and steam generation, said pipes extending across said opening therein and communicating with the interior of said base member.

5. The apparatus of claim 1, further including support means connected with said base member and extending into said opening therein, whereby a grill may be inserted into said opening and placed onto said support means.

References Cited in the file of this patent

UNITED STATES PATENTS

| | | |
|---|---|---|
| 730,525 | Edgar | June 9, 1903 |
| 1,344,582 | Cowley | June 22, 1920 |
| 2,391,571 | Hennessy | Dec. 25, 1945 |
| 2,486,345 | Triulzi | Oct. 25, 1949 |
| 2,505,976 | Leon | May 2, 1950 |

FOREIGN PATENTS

| | | |
|---|---|---|
| 1,116,586 | France | Feb. 6, 1956 |